United States Patent
Simon

(10) Patent No.: US 9,091,777 B2
(45) Date of Patent: Jul. 28, 2015

(54) INPUT VOLTAGE MODULATOR FOR RADIATION GENERATOR

(71) Applicant: Schlumberger Technology Corporation, Sugar Land, TX (US)

(72) Inventor: Matthieu Simon, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/295,374

(22) Filed: Jun. 4, 2014

(65) Prior Publication Data

US 2015/0168593 A1 Jun. 18, 2015

Related U.S. Application Data

(60) Provisional application No. 61/917,512, filed on Dec. 18, 2013.

(51) Int. Cl.
- H01J 35/02 (2006.01)
- G01V 13/00 (2006.01)
- G01V 5/12 (2006.01)
- H01J 35/14 (2006.01)

(52) U.S. Cl.
CPC ........ *G01V 5/12* (2013.01); *G01V 13/00* (2013.01); *H01J 35/14* (2013.01)

(58) Field of Classification Search
CPC ......... G01V 13/00; G01V 5/12; G01V 5/125; H01N 2235/0233; H01N 2235/06; H01N 2235/163; H01N 35/06; H01N 35/14; H05G 1/02; H05G 1/10

See application file for complete search history.

(56) References Cited

U.S. PATENT DOCUMENTS

| | | | |
|---|---|---|---|
| 3,320,513 | A | 5/1967 | Cleland |
| 3,539,903 | A | 11/1970 | Goebel |
| 4,629,889 | A | 12/1986 | Todokoro et al. |
| 5,523,939 | A | 6/1996 | Stephenson |
| 5,680,431 | A | 10/1997 | Pietras, III et al. |
| 6,198,804 | B1 | 3/2001 | Dinsmore |

(Continued)

FOREIGN PATENT DOCUMENTS

| | | |
|---|---|---|
| DE | 1563146 A1 | 1/1970 |
| WO | 2010090795 A1 | 8/2010 |

(Continued)

OTHER PUBLICATIONS

Supplementary European Search Report for European Application No. 12831040.6 dated Apr. 30, 2015.

(Continued)

*Primary Examiner* — Mark R Gaworecki
(74) *Attorney, Agent, or Firm* — Cathy Hewitt; Michael Dae

(57) ABSTRACT

A well-logging tool may include a sonde housing and a radiation generator carried by the sonde housing. The radiation generator may include a target carried by the generator housing, a charged particle source carried by the generator housing to direct charged particles at the target, and at least one voltage source coupled to the charged particle source. The at least one voltage source may include a voltage ladder comprising a plurality of voltage multiplication stages coupled to the charged particle source, and an input voltage modulator coupled to the voltage ladder and supplying an amplitude modulated signal thereto. The well-logging tool may further include at least one radiation detector carried by the sonde housing.

20 Claims, 10 Drawing Sheets

(56) References Cited

U.S. PATENT DOCUMENTS

| | | |
|---|---|---|
| 7,542,543 B2 | 6/2009 | Shampine et al. |
| 7,564,948 B2 | 7/2009 | Wraight et al. |
| 7,639,781 B2 | 12/2009 | Shampine et al. |
| 2008/0159480 A1 | 7/2008 | Wraight et al. |
| 2010/0226156 A1 | 9/2010 | Hanington |
| 2011/0002443 A1 | 1/2011 | Wraight et al. |
| 2011/0114830 A1 | 5/2011 | Reijonen et al. |
| 2011/0180698 A1 | 7/2011 | Stephenson |

FOREIGN PATENT DOCUMENTS

| | | |
|---|---|---|
| WO | 2013040390 A2 | 3/2013 |
| WO | 2013040402 A2 | 3/2013 |

OTHER PUBLICATIONS

Supplementary European Search Report for European Application No. 12831724.5 dated May 4, 2015.

Iqbal, et al. "A Bipolar Cockcrocft-Walton Voltage Multiplier for Gas Lasers," American Journal of Applied Sciences, vol. 4, No. 10, pp. 795-801, 2007, XP055184557, ISSN 1546-9239.

INPUT VOLTAGE MODULATOR FOR RADIATION GENERATOR

BACKGROUND

Radiation generators, such as neutron and x-ray generators, are used in well logging tools to take measurements of a geological formation adjacent a wellbore where hydrocarbon resources may be located (e.g., oil and/or natural gas). Neutron generators may use deuterium-deuterium (d-d), deuterium-tritium (d-t) or tritium-tritium (t-t) reactions to create neutrons without the use of radioactive materials.

Radiation generators may include a tube (e.g., a neutron or x-ray tube) and associated electrical components, such as one or more high voltage transformers with a Cockcroft-Walton ladder to produce a high operating voltage. A neutron tube is a sealed envelope made of metal and insulators including a gas reservoir, an ion source, an accelerator column and a target. The target may be made of a hydride material. Once released from the reservoir, the gas is ionized in the ion source, and then accelerated in the accelerator column toward the target. A nuclear fusion reaction occurs between the incoming ions and the hydrogen isotope atoms present in the target, causing neutrons to be directed into the geological formation. A radiation detector may detect the radiation from the geological formation resulting from the neutron bombardment, which in turn provides information regarding the composition of the geological formation.

An x-ray tube has an electron source (often called an electron gun), an acceleration column and a target. The target may be made of a heavy material, such as tungsten or gold, for example.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A well-logging tool may include a sonde housing and a radiation generator carried by the sonde housing. The radiation generator may include a target carried by the generator housing, a charged particle source carried by the generator housing to direct charged particles at the target, and at least one voltage source coupled to the charged particle source. The at least one voltage source may include a voltage ladder comprising a plurality of voltage multiplication stages coupled to the charged particle source, and an input voltage modulator coupled to the voltage ladder and supplying an amplitude modulated signal thereto. The well-logging tool may further include at least one radiation detector carried by the sonde housing.

A related radiation generator, such as the one described briefly above, and a method for making a radiation generator are also provided. The method may include positioning a target and a charged particle source in a generator housing so that the charged particle source directs charged particles at the target, and coupling at least one voltage source to the charged particle source. The at least one voltage source may include a voltage ladder comprising a plurality of voltage multiplication stages coupled to the charged particle source, and an input voltage modulator coupled to the voltage ladder and supplying an amplitude modulated signal thereto.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
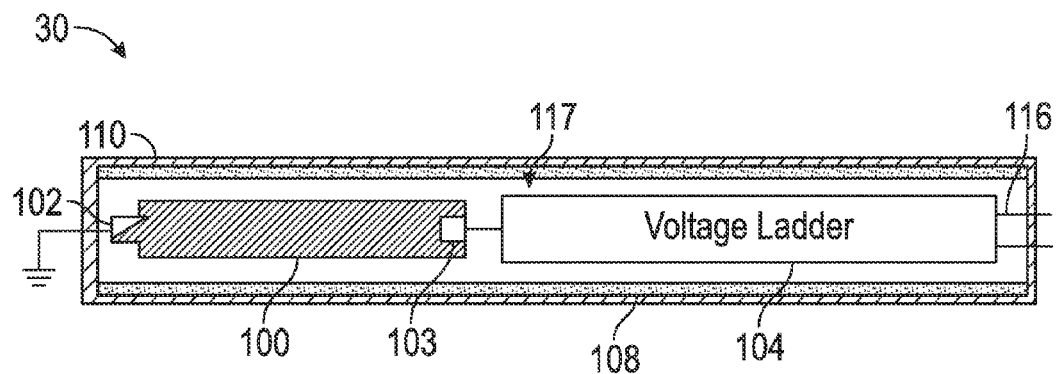
FIG. 1 is a schematic cross-sectional side view of a radiation generator in accordance with an example embodiment.
Figure 2:
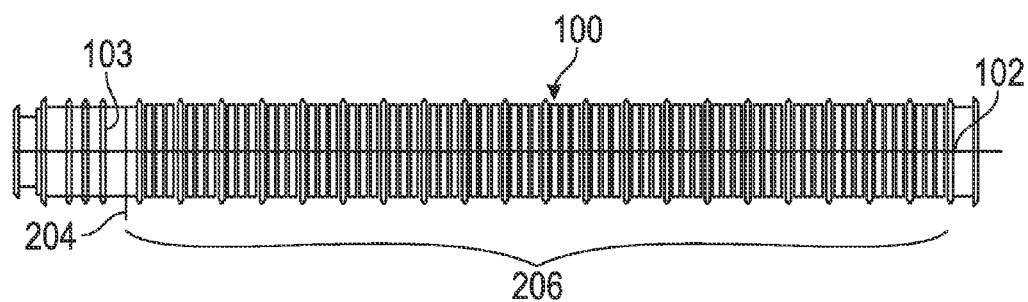
FIG. 2 is a side view of an x-ray tube which may be used in the radiation generator of FIG. 1 in an example embodiment.
Figure 3:
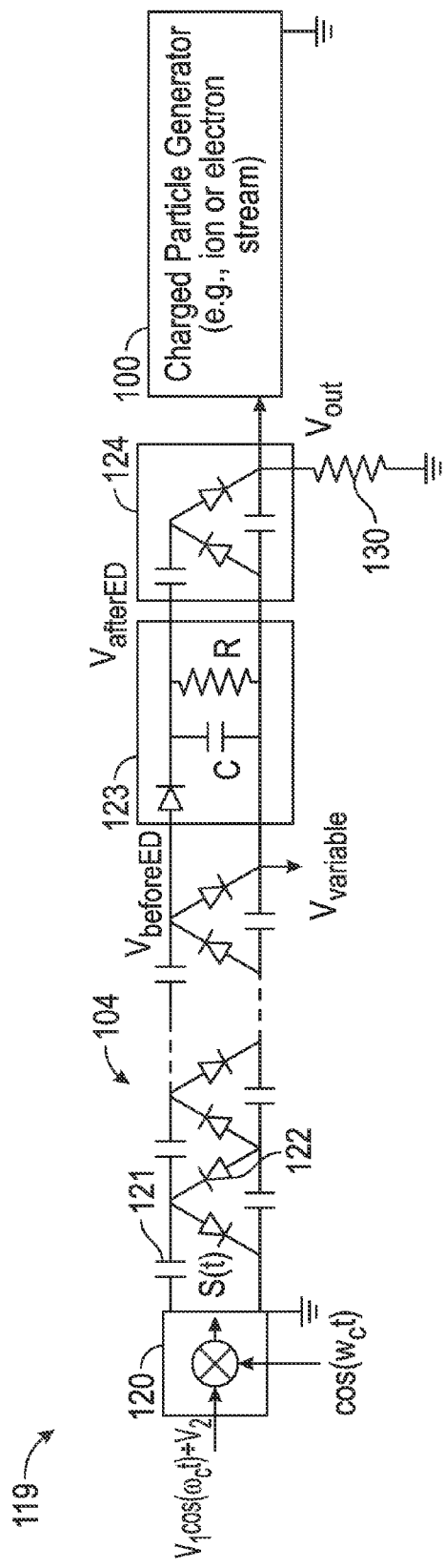
FIG. 3 is a schematic diagram of a voltage source and associated charged particle generator which may be used with the radiation generator of FIG. 1.

Referring initially to FIGS. 1 and 2, a radiation generator 30 is first described. In the illustrated example, the radiation generator is an x-ray generator which includes an x-ray tube 100 that is grounded at a target (i.e., anode) end 102, although floating target configurations may also be used in some embodiments. The x-ray tube 100 further illustratively includes a cathode 103 (e.g., a field emission array cathode such as a Spindt cathode) on the opposite end of the tube from the target end 102. The cathode 103 is coupled to a voltage multiplication ladder 104. The x-ray tube 100 and voltage multiplication ladder 104 are enclosed within one or more insulating sleeves 108 (e.g., PFA), which in turn is enclosed within a generator housing 110. An insulating gas may be inserted in the inner space 117 within the generator housing. The voltage multiplication ladder 104 further illustratively includes inputs 116 for receiving an AC voltage, e.g., on the order of several kV. The grounded target configuration shown schematically in FIG. 1 provides a simplification in the mechanical design and assembly, which may also help in maintaining mechanical stability of the target, maintaining thermal management of the target 102, as well as the radiation exposure of the insulating material 108.

The cathode 103 releases electrons in response to exposure to heat, although in some embodiments "cold" cathodes (e.g., Carbon or other nanotubes, etc.) may also be used. As will be described further below, the voltage ladder 104 applies a voltage to the cathode 103, and the introduction of current heats the cathode 103 and causes it to release electrons. A grid 204 moves electrons released from the cathode 103 toward an electron accelerating section 206. The accelerating section 206 speeds electrons toward a target 102. Upon collision with the target 102, x-rays are generated which may be used in various applications, such as downhole well-logging measurements, as will be discussed further below. By way of example, the accelerating section 206 may include a plurality of electrodes. More particularly, in one example arrangement a focusing electrode may be position downstream (or sometimes parallel to) the cathode 103. Downstream of the focusing electrode may be a puller electrode. The focusing electrode and puller electrode shape the electric field such that electrons are "pulled" out of the cathode and focused in a beam through the puller electrode. Downstream of the focusing electrode may be a series of electrodes of decreasing potential (i.e., absolute value of potential is increasing) to accelerate the electrons downstream to the target 208. When the electrons strike the target 208, x-rays are emitted from the target.

Referring now to FIGS. 3-6, an example embodiment of a voltage source 119 which incorporates the high voltage ladder 104 (here a Cockcroft-Walton voltage ladder) is used to drive the cathode 103 of the charged particle generator 100 (which may be floating at a high voltage, for example), and also to provide a variable control voltage for controlling an emission characteristic(s) of the charged particle generator. That is, the illustrated configuration may eliminate the need for a bulky isolation transformer or a relatively complex and fragile potentially floating electronics system that is traditionally used to control the emission characteristics of the charged particle generator, as will be appreciated by those skilled in the art.

The behavior of a high voltage ladder may be mathematically described with a transmission line model. The example configuration uses the high voltage ladder 104 as a transmission line to provide a variable control voltage on top of the high voltage delivered by the ladder, without having an isolation transformer or floating electronics system to provide such a control voltage. More particularly, the voltage source 119 illustrated in FIG. 3 includes an input voltage modulator 120 which receives an AC signal from a high voltage driver (not shown), from within a sonde housing in which the radiation generator 30 is located, in the case of a downhole tool, for example. In the illustrated example, the high voltage input signal is represented by the equation $V_1 \cos(\omega_b t) + V_2$. The input voltage modulator 120 modulates the high voltage input signal with a signal $\cos(\omega_c t)$ to provide an amplitude modulated signal S(t) to the high voltage ladder 104, which is also referred to as the input voltage $V_{in}$ herein.

By way of background, an amplitude-modulated (AM) signal has the mathematical form:

$$S(t) = A[1 + m(t)] \cos(\omega_c t),$$

where m(t) is the baseband signal, $A \cos(\omega_c t)$ is the carrier wave, and $\omega_C$ is the angular frequency ($\omega_C = 2\pi f_c$, where $f_c$ is the frequency of the carrier wave). In the present application, the AM signal has the form:

$$S(t) = A[1 + m(t)] \cos(\omega_c t) = [V_1 \cos(\omega_b t) + V_2] \cos(\omega_c t),$$

with $\omega_b = 2\pi f_b$, where $f_b$ is the frequency of the baseband signal.

Figure 4:
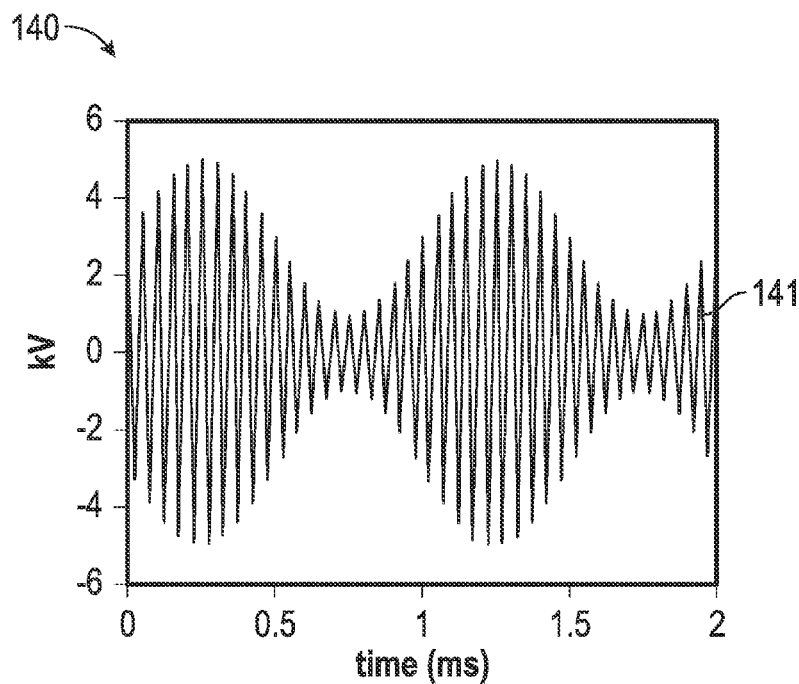
FIG. 4 is a graph of an amplitude modulated signal generated by the input voltage modulator of the voltage source of FIG. 4 as an input to the high voltage ladder.

A plot 141 of the output S(t) of the input voltage modulator element 120 is illustrated by the graph 140 of FIG. 4. The peak-peak voltage $2(V_1 + V_2)$ may be several kilovolts and provides the input of the Cockcroft-Walton ladder 104. In this example, the ladder 104 has eight stages, and the peak-peak input voltage is 10 kV ($V_1 = 2$ kV and $V_2 = 3$ kV), although other numbers of stages and voltages may be used in different embodiments. More particularly, the Cockcroft-Walton ladder 104 includes capacitors 121 and diodes 122 and has N multiplication stages (where N=8 in the example embodiment). The output of the ladder $V_{ladder}$, assuming a 100% voltage efficiency (for simplification) is equal to:

$$V_{ladder} = -N \times 2(V_1 + V_2) \quad \text{(a)}$$

The negative sign comes from the negative configuration of the ladder in the present example, although it may be a positive configuration in other embodiments.

Figure 5:
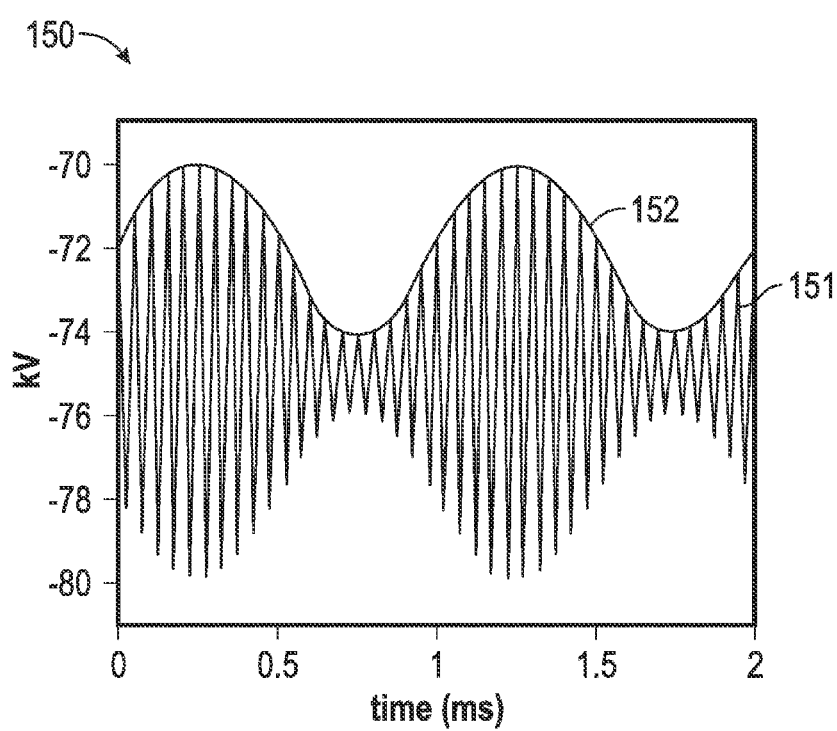
FIG. 5 is graph of the output voltage from the voltage ladder of the voltage source of FIG. 3.
Figure 6:
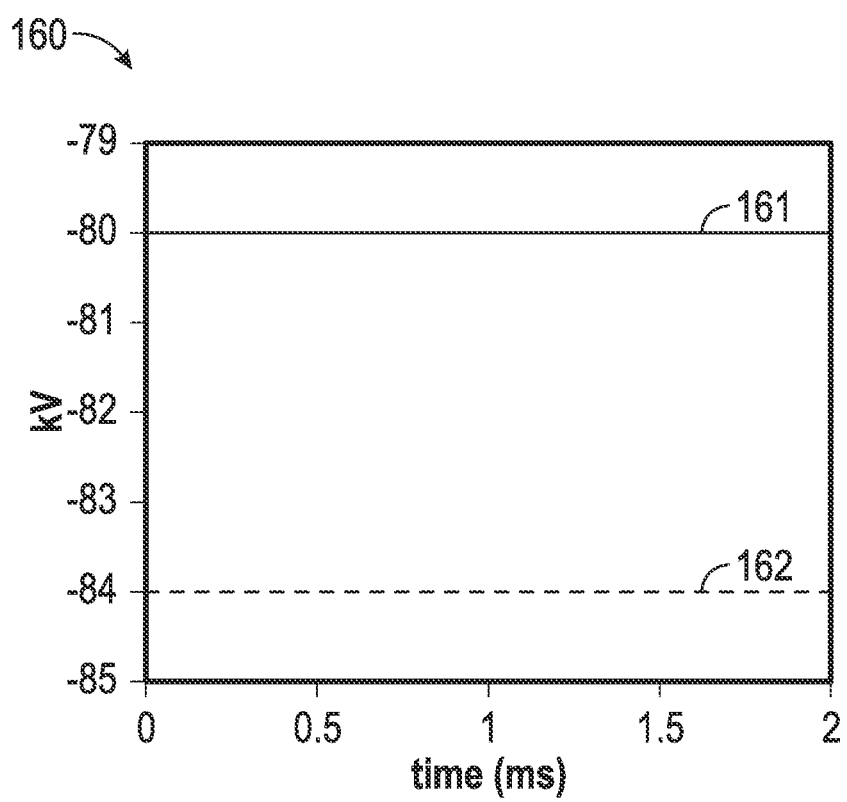
FIG. 6 is a graph of DC ladder and output voltages from the voltage ladder of the voltage source of FIG. 3.

The DC output voltage $V_{out}$ of the ladder 104 is −80 kV in this particular example, as illustrated by the plot line 161 in the graph 160 of FIG. 6 (i.e., −8×2(2 kV+3 kV)). The voltage across the last stage of the ladder 104 is approximately equal to the input voltage of the ladder. A plot line 151 of the graph 150 of FIG. 5 illustrates a voltage $V_{beforeED}$ on the AC leg of the ladder 104 upstream from an envelope detector 123, which is approximately equal to:

$$V_{beforeED} = -N \times 2(V_1 + V_2) + (V_1 + V_2) + [V_1 \cos(\omega_b t) + V_2] \cos(\omega_c t).$$

The function of the envelope detector 123 is to extract the envelope of the signal, $|V_1 \cos(\omega_b t) + V_2|$, which is illustrated by the curve 152 in FIG. 5. The output of the envelope detector $V_{afterED}$ is approximately equal to $$V_{afterED} = -N \times 2(V_1 + V_2) + (V_1 + V_2) + [V_1 \cos(\omega_b t) + V_2].$$

This approximation is valid if $f_c \gg f_b$, and for the appropriate choice of R and C in the envelope detector 123, as will be appreciated by those skilled in the art.

The voltage source 119 further illustratively includes a rectifier stage 124 to transform the AC voltage $V_{afterED}$ from the envelope detector 123 to a DC voltage $V_{out}$. In this example, the rectifier 124 is a single-stage Cockcroft-Walton ladder, although other suitable rectifiers may also be used. Note that more stages may be used to increase the output DC voltage $V_{out}$, if desired. The input voltage across the rectifier 124 is equal to:

$$(V_1 + V_2) + [V_1 \cos(\omega_b t) + V_2].$$

The output voltage $V_{out}$, after the rectifier 124, is equal to:

$$V_{out} = -N \times 2(V_1 + V_2) - 2V_1 \quad \text{(b)}$$

which is illustrated by the DC plot line 162 in FIG. 6.

From equations (a) and (b) above, it will be appreciated that a variable voltage may be generated that can be used to control an emission characteristic of the charged particle generator 100, such as to extract current from a field-emission cathode, or to steer a charged-particle beam by shaping the electric field, as follows:

$$V_{ladder} - V_{out} = 2V_1$$

In this regard, the output voltage $V_{out}$ may be considered as a variable control voltage, while the ladder 104 output $V_{ladder}$ may be considered as a fixed voltage such that a selectable difference between $V_{ladder}$ and $V_{out}$ may be used to control current extraction or beam steering with respect to the cathode 103.

Figure 7:
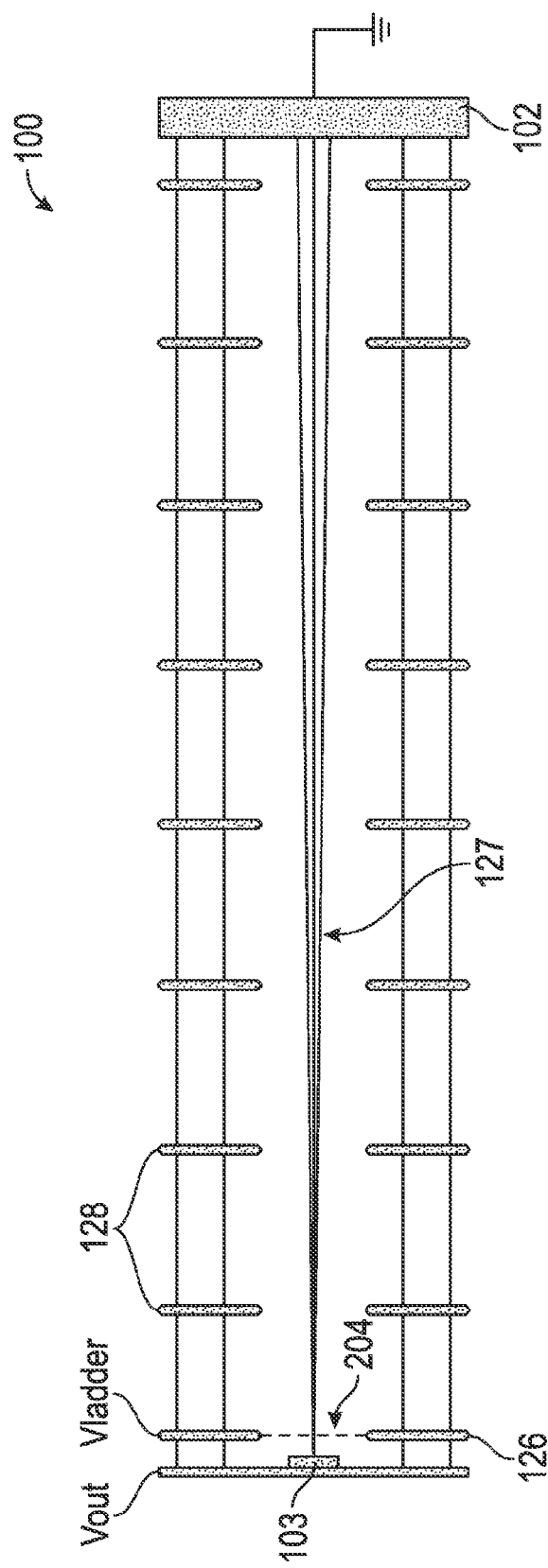
FIG. 7 is a schematic diagram of an example embodiment of the charged particle generator of FIG. 4 implemented as an x-ray generator.

An example application for a field-emission cathode 103 in an x-ray tube 100 is shown in FIG. 7. By changing the voltage on the grid 204, the emission current may be varied. More particularly, the output voltage $V_{out}$ is applied to the cathode 103, while $V_{ladder}$ is applied to the grid 204 or field-shaping electrode 126. This may advantageously change the field on the surface of the cathode 103 (i.e., change the emission current), change the beam focusing if applied on a symmetrical electrode, or steer the beam 127 if applied on an asymmetrical electrode, as will be appreciated by those skilled in the art. A series of electrodes 128 are positioned between the focusing electrode 126 and the target 102, as described further above.

Figure 8:
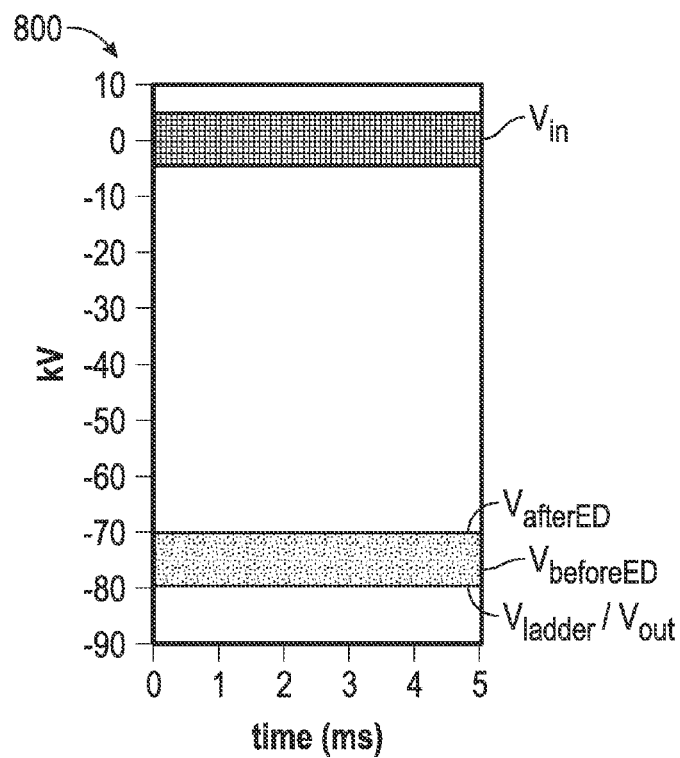
FIGS. 8-10 are a series of graphs for simulated ladder and output voltages resulting from different input voltage control parameters for the voltage source of FIG. 3.
Figure 9:
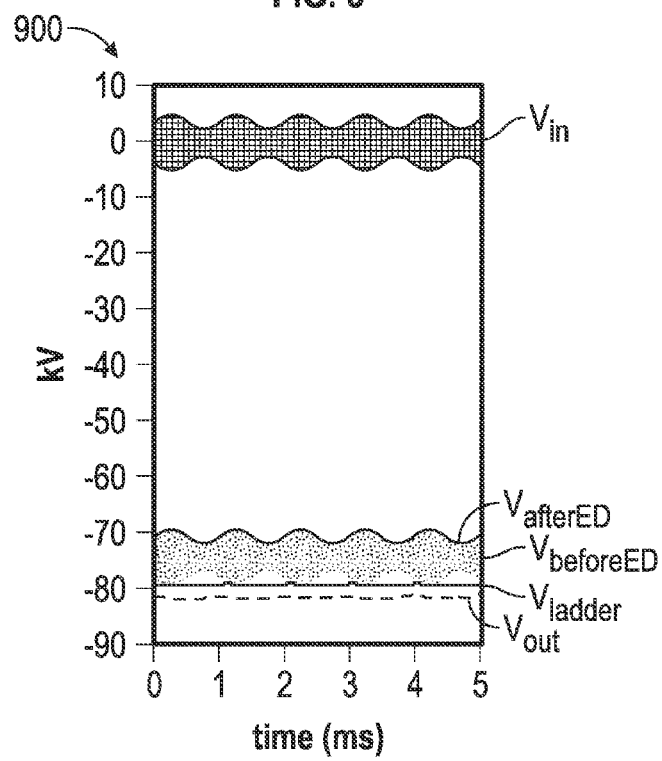
Figure 10:
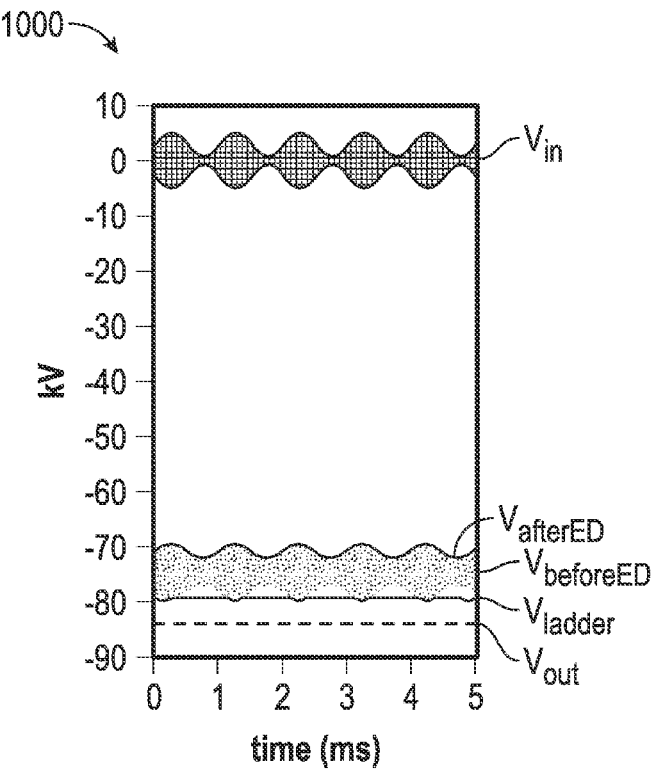
Figure 11:
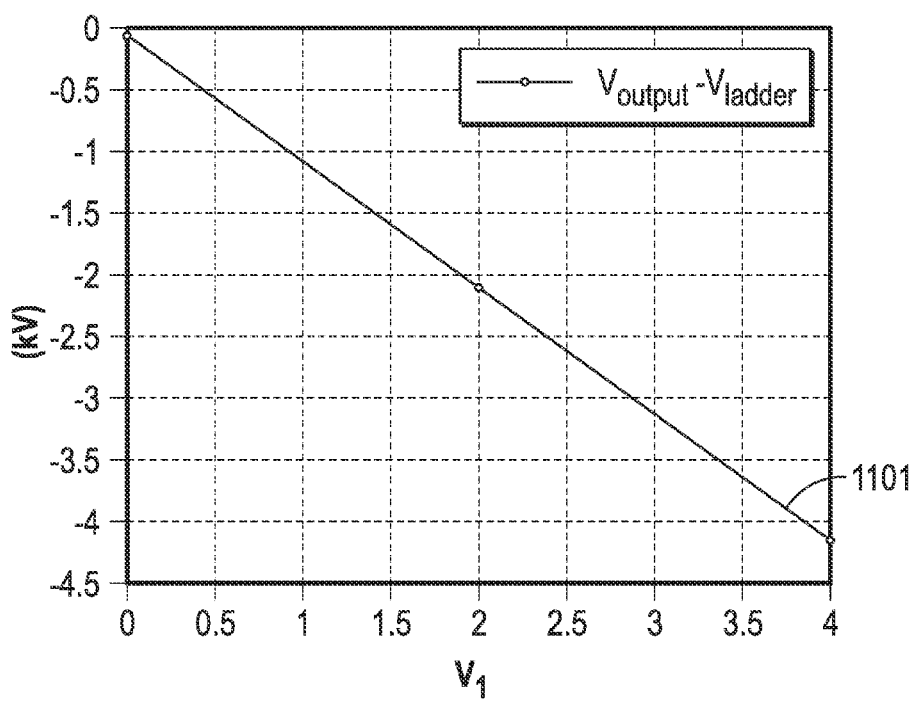
FIG. 11 is a graph of simulated differences between the ladder and output voltages for different values of input voltage control parameters for the voltage source of FIG. 3.

To validate the above-described configuration, simulations were performed with PSPICE for different values of $V_1$ (i.e., 0 kV, 1 kV and 2 kV) and $V_2$ (i.e., 5 kV, 4 kV and 3 kV). More particularly, in the graph 800 of FIG. 8, $V_1=0$ kV and $V_2=5$ kV; in the graph 900 of FIG. 9, $V_1=1$ kV and $V_2=4$ kV; and in the graph 1000 of FIG. 10, $V_1=2$ kV and $V_2=3$ kV. The sum $V_1+V_2$ was kept constant so that the voltage at the end of the ladder $V_{ladder}$ is constant and close to −80 kV. The $V_{out}$ curve varies as $V_1$ increases. In the simulations, the carrier frequency was 100 kHz, while the modulation frequency was 1 kHz. A plot 1101 of $V_{out}$–$V_{ladder}$ as a function of the input voltage component $V_1$ for the simulations is shown in FIG. 11.

The frequencies and values of the different components of the envelope detector 123 and the rectifier 124 may be changed depending on the voltage or current specifications. For example, an x-ray tube with a 100 uA beam and with a grid transparency of 50% would result in the rectifier delivering 100 uA, and thus higher capacitance values may be used in the rectifier 124, for example.

In the case of the x-ray tube 100 shown in FIG. 6, the beam energy would be given by the output voltage $V_{out}$. The beam energy may be estimated from the current flowing in a resistor 130 at the end of the ladder 104 (see FIG. 3), or by an external reference detector, for example. The beam intensity (current) may be measured directly on the target 102 or with a reference detector, as will be appreciated by those skilled in the art. To keep the beam energy and beam intensity constant, two feedback loops may be used. The beam voltage may be regulated with the parameter $V_2$ (or $V_1+V_2$), while the beam current may be regulated with the parameter $V_1$. The same applies for beam focusing or steering.

Figure 12:
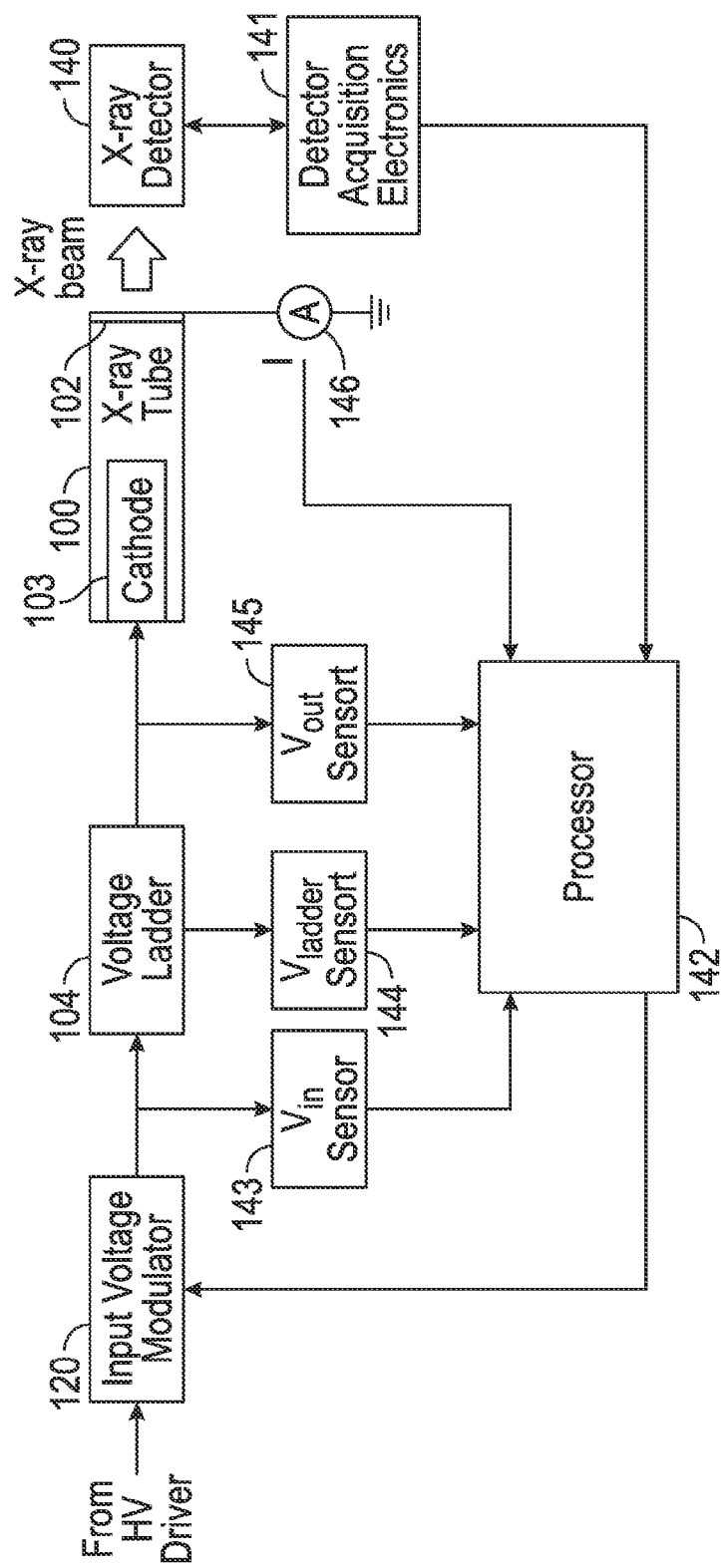
FIG. 12 is a block diagram of an x-ray generator embodiment which may include the voltage source of FIG. 3.

One example radiation generator control configuration is shown in FIG. 12, in which the AC signal from a high voltage transformer or driver is coupled to the input voltage modulator 120, as described above, and the output S(t) of the input voltage modulator (referred to a $V_{in}$ below) is coupled to the high voltage ladder 104. The voltage ladder 104 is coupled to the charged particle source 100 (here an x-ray tube including the cathode 103 and associated target 102). An x-ray detector 140 detects x-ray beams from the x-ray tube 100, and associated detector acquisition electronics 141 are coupled to the x-ray detector. A processor (e.g., a microprocessor) 142 is coupled to the input voltage modulator 120, an input voltage $V_{in}$ sensor 143, a ladder voltage $V_{ladder}$ sensor 144, an output voltage $V_{out}$ sensor 145, a cathode current I sensor 146, and the detector acquisition electronics 141.

More particularly, the processor 142 receives a measured input voltage $V_{in}$ to the ladder 104 from the input voltage sensor 143. Another input to the processor 142 is the output voltage $V_{out}$ of the ladder 104 from the output voltage sensor 145. Other inputs to the processor 142 include a target current measurement I from the cathode current sensor 146, as well as estimates of the current I and output voltage $V_{out}$ from the detector acquisition electronics 141. The processor 142 may accordingly regulate the input voltage modulator 120 to maintain constant values of the output voltage $V_{out}$, the current I. The value of the voltage $V_{out}$ and current I may be estimated with resistors strings and/or with an x-ray detector measuring both the flux and the energy of the x-ray beam, for example.

The voltage output $V_{out}$ may accordingly be regulated to the desired value. In parallel, the beam current may be adjusted to the desired value by changing the values of $V_1$ and $V_2$, as noted above.

Figure 14:
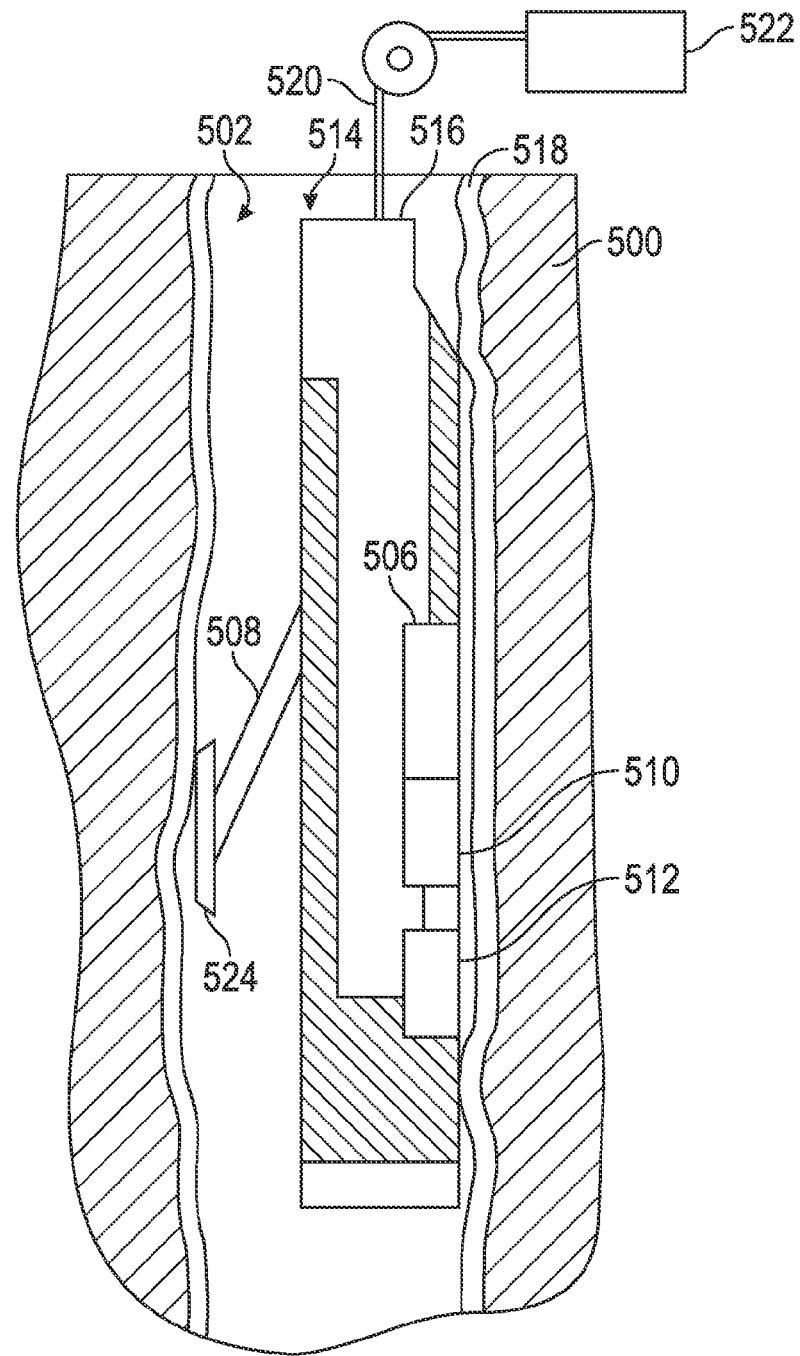
FIG. 14 is a schematic block diagram of a well-logging tool which may include a radiation generator as shown in FIG. 1.

Turning now to FIG. 14, an example application of the above-described radiation generators in a downhole well-logging tool 514 for determining the density and other properties of a formation 500 surrounding a borehole 502 is now described. As noted above, the tool 514 is positioned downhole to determine properties of the formation 500 using input radiation that is subsequently detected. In the illustrated embodiment, the tool 514 includes a sonde housing 516 that houses the components that are lowered into the borehole 502. In some embodiments, the sonde housing 516 may be a pad housing. Furthermore, a mandrel-type pressure housing may also be used for implementations such as wireline, slickline, CTD, TLC, etc. In another example configuration, the sonde housing 516 may be a collar to be carried by a Logging While Drilling (LWD) tool assembly or string, and the radiation generator may be carried or located in the chassis inside the collar, for example. The foregoing techniques may also be used for surface applications, e.g., electronic flow measurement (EFM) projects or well services projects. See, U.S. Pat. Nos. 7,542,543 and 7,639,781 both to Shampine et al., which are also both assigned to the present Assignee and hereby incorporated herein in their entireties by reference.

A radiation generator 512, such as those described above (e.g., x-ray, neutron, etc.) introduces radiation into the formation 500. The radiation is to some extent scattered from different depths in the formation 500, and the resultant radiation signal is detected by a short spaced detector 510 and a long spaced detector 506, for example, although other detector configurations may be used in various embodiments.

During the drilling process, the borehole may be filled with drilling mud. The liquid portion of the drilling mud flows into the formation 500, leaving behind a deposited layer of solid mud materials on the interior wall of the borehole in the form of mudcake 518. For reasons described below, it may be desirable to position the radiation generator 512 and detectors 506, 510 as close to the borehole wall as possible for taking measurements. Irregularities in the wall of the borehole may cause measurement degradation as the sonde housing 516 becomes longer, so it may be desirable to keep the entire tool 514 as short in length as possible. The sonde housing 516 is lowered into position and then secured against the borehole wall through the use of an arm 508 and a securing skid 524, for example. The tool 514, in one embodiment, is lowered into the borehole 502 via a wireline 520. Data is passed back to an analysis unit 522 for determination of formation properties. The tool 514 may be used downhole for wireline, logging-while-drilling (LWD), measurement-while-drilling (MWD), production logging, and permanent formation monitoring applications, as noted above, for example.

Figure 13:
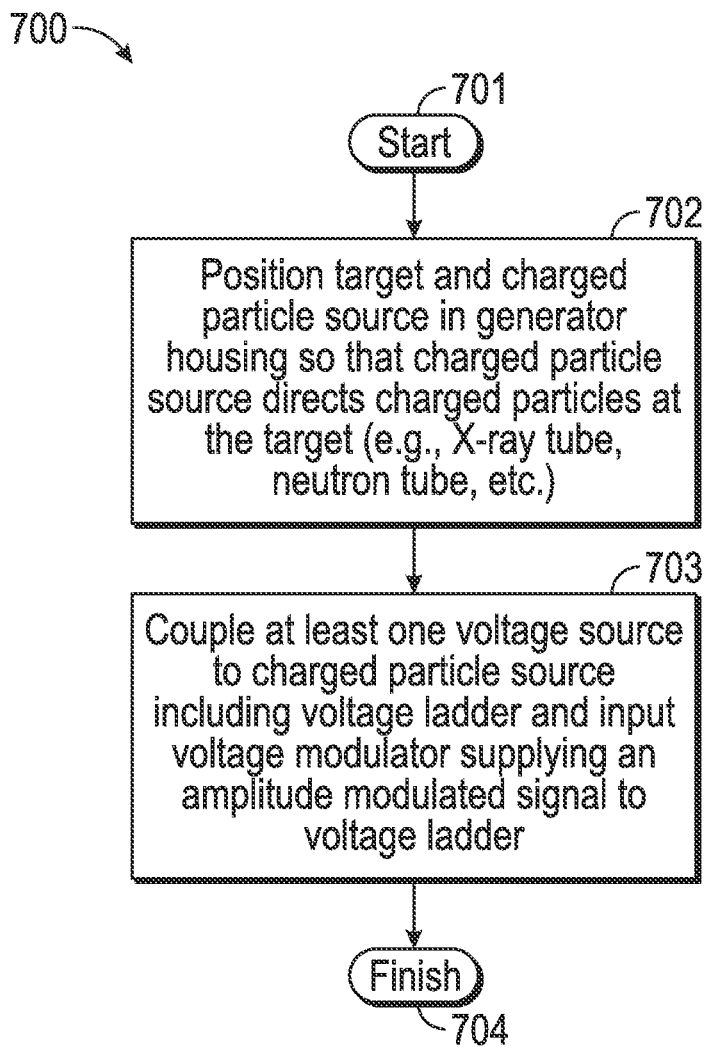
FIG. 13 is a flow diagram illustrating method aspects associated with making a radiation generator such as the one shown in FIG. 1.

A method of making radiation generators, such as those set forth above, is now described with reference to the flow diagram 700 of FIG. 13. Beginning at Block 701, a target 102 and a charged particle source 100 are positioned in a generator housing 110 so that the charged particle source directs charged particles at the target, at Block 702. The method further includes coupling at least one voltage source 119 to the charged particle source 100, at Block 703. As noted above, the voltage source 119 may include a voltage ladder 104 comprising a plurality of voltage multiplication stages coupled to the charged particle source 100, and an input voltage modulator 120 coupled to the voltage ladder and supplying an amplitude modulated signal thereto. The method concludes at Block 704.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A well-logging tool comprising:
a sonde housing;
a radiation generator carried by said sonde housing and comprising
a generator housing,
a target carried by said generator housing,
a charged particle source carried by said generator housing to direct charged particles at said target, and
at least one voltage source coupled to said charged particle source, said at least one voltage source comprising
a voltage ladder comprising a plurality of voltage multiplication stages coupled to the charged particle source, and
an input voltage modulator coupled to said voltage ladder and supplying an amplitude modulated signal thereto; and
at least one radiation detector carried by said sonde housing.

2. The well-logging tool of claim 1 wherein said voltage ladder generates a variable control voltage to selectively change an emission characteristic of the charged particle source based upon the amplitude modulated signal.

3. The well-logging tool of claim 1 wherein said at least one voltage source further comprises a rectifier coupled downstream from said voltage ladder.

4. The well-logging tool of claim 3 wherein said at least on voltage source further comprises an envelope detector coupled between said voltage ladder and said rectifier.

5. The well-logging tool of claim 1 further comprising:
at least voltage sensor coupled to said voltage ladder; and
a processor to control said input voltage modulator based upon said at least one voltage sensor.

6. The well-logging tool of claim 1 wherein said charged particle source comprises an electron stream generator.

7. The well-logging tool of claim 1 wherein said charged particle source comprises an ion stream generator.

8. The well-logging tool of claim 1 wherein said voltage ladder comprises a Cockcroft-Walton voltage ladder.

9. A radiation generator comprising:
a generator housing;
a target carried by said generator housing;
a charged particle source carried by said generator housing to direct charged particles at said target; and
at least one voltage source coupled to said charged particle source, said at least one voltage source comprising
a voltage ladder comprising a plurality of voltage multiplication stages coupled to the charged particle source, and
an input voltage modulator coupled to said voltage ladder and supplying an amplitude modulated signal thereto.

10. The radiation generator of claim 9 wherein said voltage ladder generates a variable control voltage to selectively change an emission characteristic of the charged particle source based upon the amplitude modulated signal.

11. The radiation generator of claim 9 wherein said at least one voltage source further comprises a rectifier coupled downstream from said voltage ladder.

12. The radiation generator of claim 11 wherein said at least on voltage source further comprises an envelope detector coupled between said voltage ladder and said rectifier.

13. The radiation generator of claim 9 further comprising:
at least voltage sensor coupled to said voltage ladder; and
a processor to control said input voltage modulator based upon said at least one voltage sensor.

14. The radiation generator of claim 9 wherein said charged particle source comprises an electron stream generator.

15. The radiation generator of claim 9 wherein said charged particle source comprises an ion stream generator.

16. The radiation generator of claim 9 wherein said voltage ladder comprises a Cockcroft-Walton voltage ladder.

17. A method for making a radiation generator comprising:
positioning a target and a charged particle source in a generator housing so that the charged particle source directs charged particles at the target; and
coupling at least one voltage source to the charged particle source, the at least one voltage source comprising
a voltage ladder comprising a plurality of voltage multiplication stages coupled to the charged particle source, and
an input voltage modulator coupled to the voltage ladder and supplying an amplitude modulated signal thereto.

18. The method of claim 17 wherein the voltage ladder generates a variable control voltage to selectively change an emission characteristic of the charged particle source based upon the amplitude modulated signal.

19. The method of claim 17 wherein the at least one voltage source further comprises a rectifier coupled downstream from the voltage ladder.

20. The method of claim 19 wherein the at least on voltage source further comprises an envelope detector coupled between the voltage ladder and the rectifier.

* * * * *